United States Patent Office 3,107,224
Patented Oct. 15, 1963

3,107,224
COMBUSTION RESISTANT RUBBER LATEX FOAM CONTAINING A HYDROCARBON MINERAL OIL AND A REINFORCING STYRENE POLYMER
Thomas H. Rogers, Jr., Akron, Harold H. Heineman, Louisville, and Charles L. Howard, Cuyahoga Falls, Ohio, assignors to The Goodyear Tire & Rubber Company, Akron, Ohio, a corporation of Ohio
No Drawing. Filed June 13, 1960, Ser. No. 35,456
12 Claims. (Cl. 260—2.5)

This invention relates to the compounding of synthetic rubber latices and more particularly to the production of combustion resistant latex foam rubber.

Latex foam rubber was made for a long time with natural rubber latex. Following the advent of synthetic rubber latices, latex foam rubber was soon made with blends of natural rubber latex and synthetic rubber latex in various proportions using as much of the synthetic rubber latex as was practical for economic reasons. However, latex foam rubber made with a blend of these latices in which the synthetic rubber latex is present in an amount of at least 80% supports combustion when a lighted cigarette is placed on the surface of the latex foam rubber. For example, when a lighted cigarette is placed on the surface of a latex foam rubber made from 100% synthetic rubber latex, the heat from the lighted cigarette starts a charring of the latex foam rubber which in turn develops more heat and more charring until the entire latex foam rubber is consumed and turned to ash. This destruction through combustion of the latex foam rubber will occur even when as much as 20% of the synthetic rubber latex has been replaced with natural rubber latex. Furthermore, latex foam rubber made from blended natural and synthetic rubber latices possesses lower resistance to compression than does latex foam rubber made entirely or primarily from natural rubber latex.

Prior to this invention it was known to add a reinforcing resin to synthetic rubber latex as a means of increasing the tensile strength of the latex. It was also known to add a plasticizing oil to a synthetic rubber latex as a means of producing a more soft product when made from the latex. It is observed, however, that when latex foam rubber is made from synthetic rubber latex containing a reinforcing resin in amounts ranging from about 11 to 18 parts dry weight per 100 parts dry weight of rubber latex, the latex foam rubber is consumed when subjected to the lighted cigarette test. It is also observed that when latex foam rubber is made from synthetic rubber latex containing from about 5 to 25 parts dry weight of a plasticizing oil per 100 parts dry weight of latex the latex foam rubber is also completely consumed when subjected to the lighted cigarette test.

It is now discovered that, when the reinforcing resin is used in combination with the plasticizing oil within hte same ratios disclosed for each above, the resulting latex foam rubber has an amazing resistance to combustion when subjected to the lighted cigarette test. Where the latex foam rubber was completely consumed when made using the resin alone or using the oil alone, the latex foam rubber of this invention shows only a slight recession or collapse of the latex foam rubber immediately under the burning cigarette due to a very slight charring of the latex foam rubber. Thus, for the first time a combustion resistant synthetic latex foam rubber has been made which may be used for public transportation. It is also observed that an increase in resistance to compression is possessed by the latex foam rubber of this invention.

The following example illustrate the unexpected results found in the present invention. All parts and percentages referred to herein are by dry weight unless otherwise indicated.

Example 1 (Control)

The latex foam rubber of this example was made from synthetic rubber latex compounded in the following manner:

| | Parts used | Range of parts that may be used |
|---|---|---|
| Snythetic rubber latex | 100 | |
| Antioxidant [1] | 1 | .5–2.0 |
| Sulfur (curing agent) | 1.8 | 1.0–2.0 |
| Ethyl zimate (accelerator of cure) | 0.5 | .1–1.5 |
| Zinc mercaptobenzothiazole (accelerator of cure) | 1.5 | .5–2.0 |
| Corn starch (stiffening agent) | 3 | 0–5.0 |
| Clay (filler) | 10 | 0–100 |

[1] A commercial non-staining antioxidant comprising a mixture of alkylated phenols or styrenated phenols.

Each of the above identified compounding ingredients was added as a dispersion to the rubber latex and thoroughly blended therewith and the blend allowed to mature for two hours at 80° F.

This matured latex blend was then frothed in the usual manner using a conventional beater to cause air to be trapped in the latex and thereby form the desired foam, to which foam was added the following ingredients:

| | Parts (dry weight) |
|---|---|
| Diphenyl guanidine (DPG) | 0.6 |
| Zinc oxide (activator of cure) | 3.0 |
| Sodium silicofluoride (gellant) | 2.5 |

The resulting latex foam rubber was then poured into a mold cavity of conventional construction which was closed by lowering the cover containing lugs, thereby causing the enclosed foam to conform to the shape of the mold cavity with excess foam leaving the cavity through an overflow vent. The molded latex foam rubber became gelled within 2½ minutes from the time the foam latex had been placed in the mold. The gelled latex was then vulcanized in an open-steam autoclave at 210° F. for 15 minutes. The resulting latex foam rubber was then dried for two hours at 215° F. The latex foam rubber made in this manner was subjected to the lighted cigarette test and a block of the latex foam rubber 4 inches square by 1 inch thick became completely consumed within 5 minutes after a lighted cigarette had been laid on the top of the block near the center thereof. The latex foam rubber had a stock efficiency of −12.0% and inferior tensile strength and elongation.

Stock efficiency is a measure of the relative load carrying capacity of two different latex foam rubbers, one of which is a standard. A stock efficiency of −1% indicates that one percent greater weight of latex foam rubber material is needed to develop the same resistance to compression as is developed by the standard. A stock efficiency of +1% indicates that one percent less weight of latex foam rubber material is needed to develop the same resistance to compression as is developed by the standard.

The synthetic rubber latex of Example 1 was made in accordance with the following formula.

| Materials: | Parts (dry weight) |
|---|---|
| Water | 60 |
| Butadiene-1,3 | 70 |
| Styrene | 30 |
| Tertiary dodecyl mercaptan (modifier) | 0.1 |
| Tripotassium phosphate | 0.11 |
| Versene Fe-3 | 0.005 |
| Ferrous sulfate heptahydrate | 0.005 |
| Sodium formaldehyde sulfoxylate | 0.027 |
| Diisopropyl benzene hydroperoxide (50%) | 0.045 |
| Sodium hydrosulfite | 0.016 |
| Potassium oleate | 1.23 |

Temperature (° F.), 60±10.

The reaction was allowed to proceed for a period of time sufficient to cause the conversion of the monomers to the rubbery copolymer in which the latex thereof contained 33.8% solids which was readily concentrated to a total solids content of 73% having a Brookfield viscosity of 500 cps. at 68.0% total solids content, a final surface tension of 29 dynes/cm., and an estimated average particle size of 4,500 Angstroms, and a Mooney plasticity (M/L-4) of 150.5.

*Example 2 (Control—Resin)*

The latex foam rubber of this example was made in the same manner described in Example 1 with the exception that 10 parts of a high styrene-low diene copolymer resin was substituted for 10 parts of the synthetic rubber latex. The latex foam rubber made with the 90/10 blend of synthetic rubber latex/high styrene-low diene copolymer resin was completely consumed when subjected to the lighted cigarette test, had a dry and resinous texture in contrast to the desirable soft, supple texture possessed by natural rubber latex foam, and became much less flexible at −20° F. and therefore not suitable for cushioning applications.

The high styrene-low diene copolymer resin used in this example was made as follows: Eighty-five (85) parts of styrene and 0.1 part of dodecyl mercaptan dispersed in an aqueous medium were copolymerized with 15 parts of butadiene-1,3 in the presence of a water phase comprising 200 parts of water, 5 parts of sodium rosinate, and 0.1 part of potassium persulfate at a temperature of 125° F. for a period of time sufficient to form a latex having a solids content of 32.5% after which 10.5 of phenyl beta naphthylamine was added to stop the reaction and act as an antioxidant.

*Example 3 (Control—Oil)*

The latex foam rubber of this example was made in the same manner described in Example 1 with the exception that 5 parts of a plasticizing oil was substituted for 5 parts of the synthetic rubber latex used in making the latex foam rubber. The resulting latex foam rubber was then subjected to the lighted cigarette test and became completely consumed. The foam had a stock efficiency of −20%.

The plasticizing oil used in this example was a mineral oil sold by the Sun Oil Company as Sun RPO-551.

*Example 4 (Combustion Resistant Latex Foam Rubber)*

The latex foam rubber of this example was made directly in accordance with the manner disclosed by Example 1 with the exception that 5 parts of the mineral oil used in Example 3 and 10 parts of the high styrene-low diene resin used in Example 2 were substituted for 10 parts of the synthetic rubber latex and the resulting blend of 90 parts of synthetic rubber latex, 10 parts of high styrene-low diene resin, and 5 parts of mineral oil allowed to stand for one hour at room temperature (20° C.) to permit the blend to mature. The resulting matured blend of rubber latex/resin/oil was then compounded in the manner described in Example 1 and a latex foam rubber made therefrom in the same manner described in Example 1. The resulting latex foam rubber was subjected to the lighted cigarette test and found to have melted only slightly in the immediate vicinity of the lighted cigarette forming a slightly charred depression slightly larger than the length and width of the cigarette placed thereon. Latex foam rubber made from the blended latex had a stock efficiency of +5.0%, a tensile strength of 6.7 p.s.i., an elongation of 215%, a compression set of 4.5%, and no appreciable stiffening observed at −20° F.

Although each of the foregoing examples involves the use of a styrene/butadiene rubbery copolymer latex, any synthetic rubber latex that may be adapted to conventional processes for the manufacture of frothed latex foam rubber may be used. Thus, synthetic rubber latices may be used that are made from one or a mixture of the following polymerizable materials: a diene hydrocarbon, for example butadiene-1,3, isoprene, 2-phenyl-butadiene-1,3, 2,3-dimethyl-butadiene-1,3 and piperylene; cyanated dienes, for example cyano-butadiene-1,3. The polymerizable monomers that may be used in making a synthetic rubber latex useful in this invention may be a mixture of one or more of the butadienes listed above with one or more monomers copolymerizable therewith and which are capable of forming rubbery copolymers and which may be termed generically as a "butadiene polymer synthetic rubber latex." Monomers copolymerizable with a diene of the nature noted above may be a compound containing a single $CH_2{=}C{=}$ group where at least one of the disconnected valences is attached to an electronegative group, that is a group which substantially increases the electrical symmetry or polar character of the molecule. Examples of such monoolefins containing a terminal methylene group and copolymerizable with the dienes noted above are the aryl olefines such as styrene, vinyl naphthalene, alpha methyl styrene, the alpha methylene carboxylic acids and their esters, nitrile and amides, such as acrylic acid, methyl acrylate, methyl methacrylate, acrylonitrile, methacrylonitrile, methacrylamide; methyl vinyl ether; methyl vinyl ketone; alpha, beta, and gamma vinyl pyridines, 5-ethyl-2-vinyl pyridine, 2-methyl-5-vinyl pyridine, and vinyl carbazole. Commercially many of the copolymers that may result from the copolymerization of certain combinations of the aforementioned copolymerizable monomers are GR-S, formerly a rubber manufactured for the United States Government and now referred to by trade names assigned to this type of rubber by the various manufacturers thereof; isoprene-styrene copolymer; and polyisoprene.

The plasticizing oil that is to be used in producing the results discovered in making a combustion-resistant latex foam rubber may be any oily liquid which has a plasticizing influence on the rubber latex and on the resin blended therewith and the oil is to be used in amounts ranging from about 5 parts to about 25 parts dry weight per 100 parts dry weight of rubber latex. Representative examples of the oily liquids found useful in producing the unexpected results when used in combination with a resin and a rubber latex are the hydrocarbon mineral oils, particularly those known by the following commercial names:

| | |
|---|---|
| Sundex 53 | Flexol 8N8 |
| Dutrex 6 | Hercoflex (octyl-decyl phthalate) |
| Dutrex 7 | Dioctyl phthalate |
| Dutrex 33 | QXS158B |
| Circosol 2XA | QXS158D |
| Califlux GP | QXS158E |
| Sovaloid N | QXS158F |
| Sovaloid O | QXS158G |
| Phillips 9002 | QXS158H |
| Cardolite 625 | Polydodecyl benzene |
| Necton 45 | QXS–I |
| Liquid Poly B.D. | QXS–J |
| ASTM #1 | QXS–K |
| ASTM #2 | QXS–L |
| ASTM #3 | QXS–M |
| TP90B | Circle light oil |
| Sundex 96 | Neville heavy oil |
| Harflex 500 | Bardol B |

In addition the following oil extenders may be used: Necton 60, phenol extract of a naphthenic distillate; Nuso 125, a phenol extract of a coastal crude distillate; 500 distillate, distillate of a coastal crude; Barnhardt motor oil distillate, motor oil distillate fraction from a Texas crude; Roxtone 180, distillate of a heavy naphthenic Colombian crude; Barosa 43XT, phenol extract from a mixed base of Gulf Coast crude; C–22 Aromatic Oil, the aromatic oil fraction from thermal cracking of the heavy ends obtained by catalytic cracking of virgin gas oil from Texas crude; Process Oil #1, phenol extract of a motor oil distillate from a Texas crude; Circosol 2XH, commercial oil obtained from the Sun Oil Company; Sun Process Oil #551; SPX 97, commercial oil obtained from the Shell Oil Company; Barosa X56, a phenol extract from a mixed base Gulf Coast crude having a higher viscosity than Barosa 43XT; Diol 80, an acid-treated naphthenic distillate; Colombian distillate, distillate from a Colombian crude; Colombian raffinate, raffinate from phenol extraction of Colombian distillate.

Any resin normally used for reinforcing synthetic rubber latices may be used in the present invention and resins of particular value are those made from butadiene-1,3 and styrene in proportions to produce a resinous copolymer in contrast to a rubbery copolymer and in which at least 40 parts of styrene and preferably more than 50 parts are used in order to produce the resinous property desired in this type of resin. Thus, resinous copolymers resulting from the aqueous emulsion polymerization of a mixture of styrene and butadiene-1,3 in which the styrene may be present in amounts from about 40 parts to 100 parts per 100 parts of total monomer being reacted may be used in this invention. Preferred resins of this nature are those resulting from the polymerization of a mixture containing 85 to 95 parts of styrene and 15 to 5 parts of butadiene-1,3. Polystyrene latex may be used in this invention. Resinous copolymers resulting from the polymerization of acrylonitrile with butadiene-1,3 present in amounts similar to those described with respect to styrene may also be used.

While certain representative embodiments and details have been shown for the purpose of illustrating the invention, it will be apparent to those skilled in this art that various changes and modifications may be made therein without departing from the spirit or scope of the invention.

What is claimed is:
1. Latex foam rubber comprising
   (A) a rubbery conjugated diene polymer,
   (B) a synthetic rubber-reinforcing resinous polymer,
      (1) made by polymerizing 85 to 100 parts of styrene with from 15 to 0 parts of a conjugated diene monomer, and
   (C) a hydrocarbon mineral oil having a plasticizing effect on the rubber,
the amount of (B) present ranging from about 10 to about 18 parts per 100 parts of (A) and the amount of (C) present ranging from about 5 to about 25 parts per 100 parts of (A).
2. A latex foam rubber as claimed in claim 1 wherein (A) is a butadiene polymer.
3. A latex foam rubber as claimed in claim 1 wherein (A) is a rubbery copolymer of styrene and a conjugated diene.
4. A latex foam rubber as claimed in claim 3 wherein the diene of (A) is butadiene.
5. A latex foam rubber as claimed in claim 1 wherein (B) is polystyrene.
6. A latex foam rubber as claimed in claim 2 wherein (B) is polystyrene.
7. A latex foam rubber as claimed in claim 3 wherein (B) is polystyrene.
8. A latex foam rubber as claimed in claim 4 wherein (B) is polystyrene.
9. A latex foam rubber as claimed in claim 1 wherein (B) is a copolymer resulting from the polymerization of 85 to 95 parts of styrene with 15 to 5 parts of a conjugated diene.
10. A latex foam rubber as claimed in claim 9 wherein the diene of (B) is butadiene.
11. A latex foam rubber as claimed in claim 10 wherein 85 parts of styrene are copolymerized with 15 parts of butadiene.
12. A latex foam rubber as claimed in claim 1 wherein
100 parts of (A) is present,
11.1 parts of (B) is present, and
5.55 parts of (C) is present.

References Cited in the file of this patent
UNITED STATES PATENTS

| | | |
|---|---|---|
| 2,567,950 | Stauffer | Sept. 18, 1951 |
| 2,594,217 | Rogers et al. | Apr. 22, 1952 |
| 2,643,987 | Harrison et al. | June 30, 1953 |
| 2,680,140 | Carter | June 1, 1954 |
| 2,711,400 | Harrison et al. | June 21, 1955 |
| 2,880,185 | Lee | Mar. 31, 1959 |
| 2,933,768 | Morris | Apr. 26, 1960 |

OTHER REFERENCES

Whitby: "Synthetic Rubber," copyright 1954, by John Wiley and Sons, Inc., New York, pages 706 and 707.